Feb. 8, 1927. 1,617,224
P. W. SHAW
METHOD OF UNITING METAL SECTIONS
Filed Dec. 24, 1923
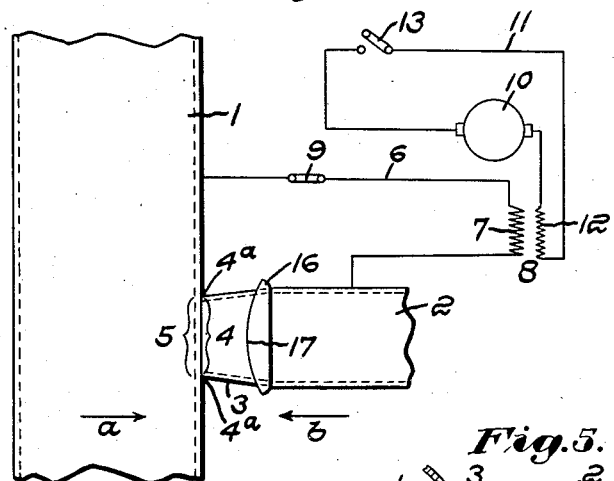
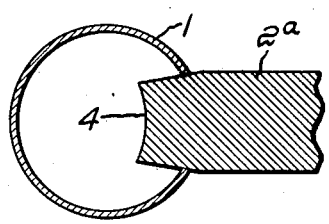
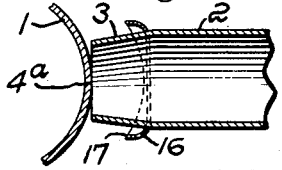
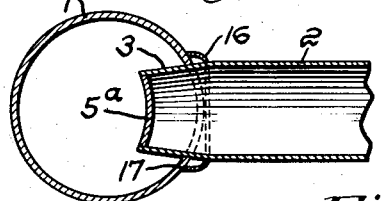
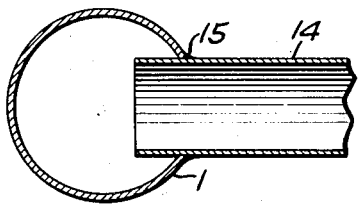
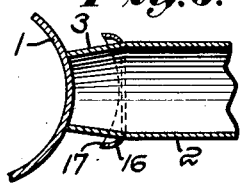
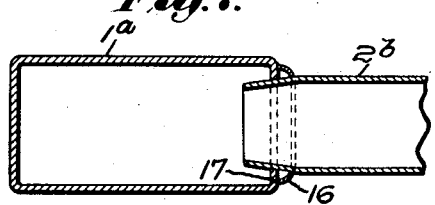
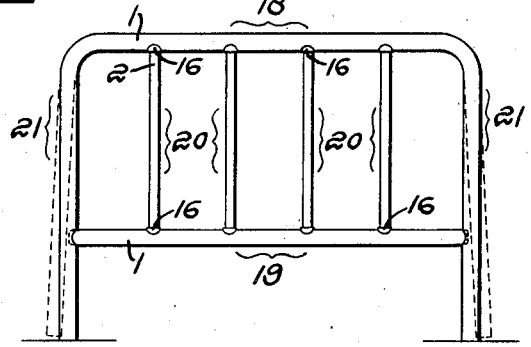
Inventor:
Percy W. Shaw,
by Emery, Booth, Janney & Varney
Attys.

Patented Feb. 8, 1927.

1,617,224

UNITED STATES PATENT OFFICE.

PERCY W. SHAW, OF LYNN, MASSACHUSETTS.

METHOD OF UNITING METAL SECTIONS.

Application filed December 24, 1923. Serial No. 682,510.

This invention aims to improve the method of uniting metallic sections and in the accompanying drawings showing certain steps of the process and an example of its application, Fig. 1 is a diagram illustrating two sections of metal about to be treated in accordance with the process embodying this invention;

Fig. 2 is a detail section of a completed joint;

Fig. 3 is a detail section of a joint composed of a different form of inserted member;

Fig. 4 illustrates one of the steps in the operation which involves the use of a solid tapered electrode;

Fig. 5 is a detail view illustrating the boring and bored sections in starting positions;

Fig. 6 is a detail view illustrating parts shown in Fig. 5 advanced a step in the boring operations;

Fig. 7 is a detail section of a joint composed of a rectangular section; and

Fig. 8 is an elevation of a bedstead showing one example of an article to which the joint of the invention is particularly applicable.

In the metal-working art, it is often desirable to form joints between similar and dissimilar sections and particularly tubular sections as, for example, in the making of metal bedsteads wherein a number of filler rods or tubes, sometimes rectangular, round or of irregular cross section are united with larger sections constituting the cross pieces or rails of the bed, which cross pieces may also be rectangular, round or, in fact, any desired cross-sectional form and, in this connection several methods have been employed among which is the method of forming holes in one piece and inserting therein the other piece and then in securing them by soldering, welding or otherwise.

Where holes are formed in one of the sections for the reception of the other, particularly in thin metal tube sections, great difficulty is experienced in keeping the hole true to form or at the desired location because of the catching of drill as it begins to cut through the shell, sometimes denting the tube and leaving the edges exceedingly rough so that an additional reaming operation is often necessary and even then the hole is apt to be dislocated. This method is exceedingly expensive where rectangular or other irregularly shaped parts are to be joined because of the difficulty in forming the irregularly shaped holes.

The present invention involves a method of uniting metal sections of substantially any cross-sectional form which practically eliminates the disadvantages, especially those enumerated, and expensive steps heretofore employed, and is equally effectual in the joining of round sections with round sections, round sections with square or rectangular sections, rectangular or square sections with square or rectangular sections, and round, square or rectangular sections with flat sections, or in fact substantially any combination that may be desired.

In the practising of my method I preferably arrange the two parts that are to be united at the proper angle relatively to each other, for example at right angles as shown in Fig. 1 wherein is illustrated a relatively large tubular section of metal 1 and a smaller section 2, which latter, herein, is to be inserted in the side of the large section.

An important step in the operation of uniting the sections is the forming of a hole in one of the sections, herein the part 1 into which the end of the other section is to be fitted and this is preferably accomplished by concentrating sufficient heat upon the area where the hole is to be formed to burn away a section of that metal of the desired size to form the initial opening.

Any appropriate method of burning or fusing the metal to form said initial opening may be used but preferably I employ an electric current, herein an alternating current, which is transmitted in part through the section in which the hole is to be made and in part by an electrode having an operating end embodying a shape consistent with the shape of the finished hole, said end being arranged in such relation to the area to be removed as to produce a state of incandescence or a fusible state in adjoining parts.

By placing the two parts in the aforesaid relation when the current is passing from one to the other, the metal of the larger section or the part in which the hole is to be formed, will be burnt away by the electric current and thus produce the initial hole.

It is desirable, during this operation, to advance the boring electrode as fast as its end and the adjoining metal of the other part is removed by the said operations so as to insure and maintain said relation until the operation is completed.

Obviously the continued advancing of the electrode after the hole has been formed, provided the electric current is still supplied to the parts, will cause the current to pass laterally from the boring electrode into the surrounding metal of the other part and cause said hole to be slightly larger than the boring part. This action also tends to make the edge of the hole rather rough. So to overcome these objections, said boring member is preferably tapered and after the hole has been formed clear through the bored part and while the metals of the two parts are still hot and substantially plastic, said tapered electrode is preferably forced into the hole by any appropriate instrumentalities to ream or enlarge the same the desired amount, making the edges thereof substantially smooth.

Preferably the electric current is cut off before the finishing operation is effected or, at least, before it has been fully completed in order to prevent further burning or fusing of the surrounding metal.

It is within the scope and purpose of the invention to compose the boring electrode of any appropriate material such, for example, as copper which has a relatively higher electrical conductivity than the metal, herein steel from which the tube is generally formed and will not heat up to a melting point as does said steel but will merely serve as a current carrier.

It is not, however, necessary that a material of higher electric conductivity be always used for the reason that the boring section receives its melting action longitudinally while the bored part is melted laterally or merely through its shell and, although some of the metal of the boring member may reasonably be expected to melt, yet this amount will be so small as compared with its length as to be negligible.

When an electrode is to be used solely as a boring tool it is operated as hereinbefore described until the hole of the required diameter and depth is formed when said boring tool may be withdrawn and the other section of the joint inserted in said hole, preferably while the bored part at least is hot, after which they are allowed to cool and shrink and thereby be securely bound together.

It is to be understood that the invention is not limited to the use of a separate boring member because the male section of the joint may be just as effectively utilized for this purpose and to do so, said part, whether solid or hollow, is preferably tapered and after having been connected with the source of electric current, is placed in the proper relation to the part to be bored and maintained in such relation until the hole is formed. Then, with said parts or at least the bored part still hot, pressure is preferably applied to the boring member to force the same into the hole until the hole has been enlarged sufficiently to smooth the edges thereof and cause said inserted part to neatly fit said hole. These parts are then permitted to cool and adhere and to be firmly bound together, eliminating the operation hereinbefore mentioned, of removing the boring tool and inserting the other section of the joint therein.

In order that the method embodying this invention may be more readily understood, I have shown in Fig. 1 of the drawings, an example of its application wherein two sections 1 and 2 represent what are to constitute the component parts of the completed joint, it being assumed that the part 2 which is to be the male section of the joint is to serve as a boring and enlarging tool.

The section 2, herein shown of tubular form, is tapered for a portion of its length at 3 and placed with its small end 4 in current conducting relation to the area 5 that is to be removed or cut out of the section 1 into which said part 2 is ultimately to be inserted.

The two sections 1 and 2 are then connected in a suitable electric circuit 6, preferably containing secondary winding 7 of a transformer 8 and also a suitable switch 9. The terminals of said circuit are connected respectively with the parts 1 and 2 which constitute the electrodes of said circuit and an electric current of the required strength is induced therethrough from a suitable electric source, for example, by means of a generator 10 herein arranged in a circuit 11 with the primary winding 12 of the transformer 8, a switch 13 of any appropriate design being provided in said circuit to interrupt the electric current when desired.

The passing of the electric current from one section to another effects the heating up of certain limited areas of the abutting or adjoining parts, this heat being of such intensity that the metal of said parts particularly the part to be bored will be melted or eaten away by the electric current to such an extent that a section of the larger part 1 approximating the size of the small end 4 of the part 2 will be removed, forming an initial opening but, in view of the fact that the active end of said smaller section 2 is tapered, the size of the hole formed in the section 1 will not be large enough to receive the full diameter of the section 2.

The fusing action produced by the passing of the electric current from one section to another is not capable of producing a sufficiently smooth edge where the section of metal is removed. Therefore the next step in the operation of forming the hole is preferably to force the tapered ends of the section 2 farther into said hole while the metal of the part 1 surrounding it is still hot and soft and, by so doing, enlarge the said initial opening to the desired diameter. Herein the tapered section 3 preferably is not inserted its full length but is stopped before the juncture of the tapered part of the section 2 with the cylindrical part thereof is reached and the current having preferably been shut off, the tubes or sections will be allowed to cool and the smaller section firmly to adhere to the larger section. The approximately preferred relation of the sections 1 and 2, after insertion one within the other, will best be seen by referring to Fig. 2

When the section 2 is of tubular form and utilized as a boring tool, a core or disk 5ª (see Fig. 2) is generally removed by the fusing action of the electric current from the section 1 but, as the edges of this core are in a substantially fused state and are brought into contact with the end 4 of the tube 1 which is in a similarly fused or softened state, said core will adhere to the end of said tube 1.

In Fig. 4 I have illustrated a solid boring member 2ª which may be the part that is to form the male section of the joint or may constitute merely a boring and enlarging tool that is subsequently removed and the male section of the joint inserted in its place and when used in the latter capacity, the section ultimately to be inserted in the larger tube, need not be tapered but may be formed of equal diameter throughout as shown at 14 (Fig. 3) and the intersecting portions 15 of said part 14 and the tube 1 may later be welded, soldered or otherwise treated to more firmly secure the two parts together.

When the section 1 of the joint is cylindrical or of similar form in cross section presenting a substantially convex surface to the boring section, the end of said boring section being squared off, will not, at the beginning of the boring operations, conform strictly to the convex surface of the part 1, as will be seen in Fig. 5. Consequently the very first action is to effect the concaving of the end of said boring section. This is effected naturally by maintaining the small end of the boring section in fusible relation with the convex surface of the section 2, as previously described, but the fusing action upon said boring section will begin at the points 4ª (see Fig. 5) upon opposite sides of the section 2 and continue until the end 4 of the tube is concaved so as to exactly coincide with the convex face of the other section 1, as shown in Fig. 6. Until this has been done, the contact between the two parts being imperfect, substantially all of the fusing will be at the end of the boring section 2 but as soon as a complete or substantially complete contact is formed between said sections, as shown in said Fig. 6, then the boring action begins.

It is sometimes desirable to provide beads or fillers at the corners formed by the joining together of the two sections 1 and 2. Obviously this ornamentation may be made in any appropriate or desired way but herein I have shown, for this purpose, a convexly formed ring 16 which is adapted to be fitted to the tapered end 3 of the section 2 and, having a hole of slightly smaller diameter than the larger part of said tube or boring member 2, said ring 16 will be securely positioned by said taper at the desired location, it being preferably applied before the section 2 is advanced to its initial fusing position. The edge 17 of the ring 16 may, if desired, be shaped to substantially conform to the convex face of the section 1 without any distortion or it may be sufficiently flexible so that, when pressed firmly against said section 1 by the insertion of the boring or tapered section 2 in said section 1, that it will then conform to the adjacent convex face of said section 1.

During the fusing operations of the parts composing the joint, the ring 16 may be utilized to deflect the sparks thrown off by the electric current in passing from one electrode to the other and when the insertion of the two parts is nearing its completion, said ring may serve to retain some of the sparks, while in their fused state, to assist in securing the ring firmly to the other section as the final inserting pressure is applied.

It is within the scope and purpose of the invention to unite rectangular or other forms of metal as, for example, in Fig. 7, I have shown for the larger tube, a rectangular section 1ª into which is inserted a smaller section 2ᵇ which may be either rectangular, circular or square as desired, the hole in any one of said forms being produced just as easily as the others, the adjoining portions of said sections being herein covered by the collar 16.

From the foregoing it will be apparent that the invention will be applicable to many uses and different types of articles but, in Fig. 8, I have shown its adaptation to the formation of a bedstead herein composed of tubular sections 18 and 19 constituting the upper and lower cross pieces, either one of which is equivalent to the section 1 (Figs. 1 to 6) and these sections are shown united by filler rods, herein tubes 20, preferably the equivalents of the section 2 of said figures By utilizing the method of this invention in the formation of such a bedstead it will be obvious that a great deal of labor and expense will be eliminated because of the fact that both ends of all of the filler rods 20 and their adjacent parts 18 and 19 may be simultaneously operated upon as described by moving the parts 18 and 19 toward each other and toward the opposite ends of said rods 20 so as to bore all of the holes at once.

When the holes have been formed in said sections 18 and 19, pressure may then be applied to force the two parts 18 and 19 upon the tapered ends of said tubes and, after allowing time to cool and shrink, the joints will be substantially complete unless it is desirable to solder, weld or otherwise treat said joints for further security.

During the foregoing operations upon the bedstead, the side pieces 21, when formed as integral parts of the top piece 18, may be bent outwardly as shown in dotted lines in Fig. 6 until after the filler rods or tubes 20 have been securely fastened within the sections 18 and 19 but, following the completion of the said operations, said side-pieces 21 may be contracted until the ends of the sections 19 are brought in suitable relation thereto, whereupon the electric current, having been turned on as aforesaid, a similar process will be carried out until the ends of said section 19 are firmly embedded within the said side pieces 21 as shown by the full line positions of said side pieces.

Where the aforesaid method is employed, particularly in the construction of bedsteads, a very large saving in metal will be effected as well as a saving in labor due to the elimination of the drilling and reaming operations and also the subsequent soldering or welding because, with applicant's method, where the tapered tubes are employed, said tubes need not be forced through the larger sections more than a very small fraction of the diameter of said large sections yet the tapers and the subsequent shrinkage or adhesion of the parts will cause the larger tubes to firmly grip the smaller ones and prevent settling of the filler rods even though said rods are not extended into their fellow members and into contact with the opposite inner surfaces thereof.

Having thus described certain embodiments of my invention I desire it to be understood that although specific terms are employed they are used in a generic and descriptive sense and not for purposes of limitation, the scope of the invention being set forth in the following claims:

1. That method of uniting metallic sections which includes the subjecting of one of said sections to a fusing heat until a hole is burnt therein and the metal surrounding said hole is relatively soft and then in forcing a tapered member into said hole to enlarge said hole to the required size of said tapered member, whereby if said tapered member is allowed to remain in said hole said sections will adhere when cooled.

2. That method of uniting metallic sections which includes the subjecting of one of said sections to a fusing heat until a hole is burnt therein and then, while the metal is still hot, in forcing a tapered member into said hole to enlarge said hole to the required size to fit said tapered member, whereby when said metal cools it will adhere to said tapered member.

3. That method of uniting metallic sections which includes the subjecting of one of said sections to a fusing heat until a hole is melted therein and then, while the metal is still hot, in forcing a tapered section into said hole.

4. That method of uniting metallic sections which includes the subjecting of one of said sections to a fusing heat until a hole is burnt therein and then, while the metal is still hot, in forcing the tapered section into said hole a distance less than the length of the taper.

5. That method of uniting metallic sections which consists in tapering one of said sections, then in placing said sections in fusing relation and in passing an electric current therebetween until an initial opening is formed by said tapered section in the untapered section substantially the size of the small end of said tapered section and then, while the metal around said hole is still hot, in forcing at least a portion of said taper into said hole to enlarge and tightly fit the same.

6. That method of uniting metallic sections which consists in tapering some of said sections, then in connecting said sections with an electric source and in maintaining the small ends of said tapered sections in fusing relation with the other sections until holes are formed in said other sections and then, while the metal surrounding said holes is hot, in forcing the said tapered ends into said holes to enlarge and tightly fit them.

7. That method of uniting metallic sections which includes the burning of a hole in one of said sections and while the metal thereof is hot, in forcing a tapered member into said hole to enlarge said hole to a predetermined size to fit said tapered member.

8. That method of uniting metallic sections which consists in maintaining dissimilar sections in fusing relation, in supplying electric current to said sections to heat them to a meltable state until a hole is formed in one of said sections and then, while said sections are still red hot, in forcing one of said sections into said holes to increase the diameter thereof.

9. That method of uniting metal sections which includes the maintaining of said sections in substantial contact, then in supplying an electric current through said sections to effect the burning away of a portion of one section substantially coinciding with the contacting area of the other section, then in forcing a tapered member in to said hole while the metal surrounding the same is hot, to enlarge said hole to conform to a selected diameter of said tapered member, whereby when said hot metal cools and contracts the two parts will adhere one to the other.

10. That method of forming a joint which consists in maintaining a tapered section in fusing relation to a second section and in supplying an electric current through the adjoining areas of said sections until an opening is formed in said second section substantially the size of the small end of said tapered section and then in forcing said tapered section into said hole to enlarge the same to the desired size.

11. That method of forming a joint which consists in maintaining a tapered section in fusing relation to a second section and in supplying an electric current through the adjoining areas of said sections until an opening is formed in said second section substantially the size of the small end of said tapered section and then, while said sections are hot, in forcing said tapered section into said hole to enlarge the same to the desired size and then in shrinking said sections to bind them together.

12. That method of forming a joint which consists in maintaining a tapered section in fusing relation to a second section and in supplying an electric current through the adjoining areas of said sections until an opening is formed in said second section substantially the size of the small end of said tapered section and then, while said sections are hot, in forcing said tapered section into said hole to enlarge the same to the desired size and then in effecting the binding of the adjoining edges of said section together.

13. That method of uniting metallic sections which includes the subjecting of one of said sections to a fusing heat until a hole is melted therein and then, while the metal is still hot, in forcing a larger section into said hole.

14. That method of forming a joint which consists in tapering one of said sections, then in placing thereon a ring adapted to fit said taper, then in maintaining said section in sparking or fusing relation to a second section and in passing an electric current between the sections until a hole is formed in said second section substantially the size of the small end of said tapered section and then in forcing said tapered section into said hole until said ring engages said second section.

15. That method of forming a joint which consists in tapering one of said sections, then in placing thereon a ring adapted to fit said taper, then in maintaining said section in sparking or fusing relation to a second section and in passing an electric current between the sections until a hole is formed in said second section substantially the size of the small end of said tapered section and then, while the parts are hot, in forcing said tapered section into said hole until said ring conforms to the surrounding surface of said second second section.

16. That method of forming a bedstead which includes the tapering of the end of a filler rod and in placing said tapered end in fusing relation with a cross piece of the bed, then in supplying an electric current to said parts to raise the adjoining areas thereof to a state of incandesence whereby a portion of said cross piece substantially the shape and size of the end of said filler rod is removed, and then in forcing the tapered end of said filler rod into said hole to tightly fit and adhere thereto.

17. That method of forming a bedstead which consists in tapering the ends of the filler rods, then in placing said tapered ends in fusing relation with the cross pieces of the bedstead, then in supplying electric current through said parts to fuse the metal of at least said cross piece to form holes substantially the size of the ends of said tapered filler rods, and then in forcing said tapered ends into said holes while the surrounding metal is still warm and causing the tapered ends to adhere to said cross pieces.

18. That method of uniting metallic sections which includes the subjecting of one of said sections to a fusing heat until a hole is burnt therethrough, and then in forcing a relatively rough tapered member into said hole before the metal bordering upon said hole cools, to enlarge said hole to tightly conform to the irregular surface of said tapered part, whereby when said heated parts cool and shrink said sections will strongly adhere one to the other.

In testimony whereof, I have signed my name to this specification.

PERCY W. SHAW.